United States Patent
Sethuraman et al.

(10) Patent No.: US 9,319,898 B2
(45) Date of Patent: Apr. 19, 2016

(54) WIRELESS COMMUNICATION SYSTEM WITH RATE SELECTION MECHANISM AND METHOD OF OPERATION THEREOF

(71) Applicant: Samsung Electronics Co., Ltd., Gyeonggi-Do (KR)

(72) Inventors: Vignesh Sethuraman, La Jolla, CA (US); Shahab Sanayei, San Diego, CA (US); Hairuo Zhuang, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 153 days.

(21) Appl. No.: 13/948,858

(22) Filed: Jul. 23, 2013

(65) Prior Publication Data
US 2014/0064120 A1    Mar. 6, 2014

Related U.S. Application Data

(60) Provisional application No. 61/694,722, filed on Aug. 29, 2012.

(51) Int. Cl.
| | |
|---|---|
| H04L 12/26 | (2006.01) |
| H04W 24/02 | (2009.01) |
| H04B 17/00 | (2015.01) |
| H04L 1/00 | (2006.01) |
| H04L 25/02 | (2006.01) |

(52) U.S. Cl.
CPC ............ *H04W 24/02* (2013.01); *H04B 17/00* (2013.01); *H04L 1/00* (2013.01); *H04L 25/0228* (2013.01)

(58) Field of Classification Search
USPC ......... 370/229, 230, 235, 236, 241, 248, 252, 370/328, 329, 332
See application file for complete search history.

(56) References Cited

U.S. PATENT DOCUMENTS

| | | | |
|---|---|---|---|
| 8,281,201 B2 | 10/2012 | Kim et al. | |
| 8,316,269 B2 | 11/2012 | Hsuan et al. | |
| 8,432,849 B2 * | 4/2013 | Krishnasawamy et al. | ... 370/317 |
| 2006/0133533 A1 * | 6/2006 | Khandekar et al. | ........... 375/279 |
| 2007/0293233 A1 * | 12/2007 | Inoue et al. | ................... 455/450 |
| 2008/0043657 A1 * | 2/2008 | Ishii et al. | .................... 370/311 |
| 2009/0185644 A1 * | 7/2009 | Valadon et al. | .............. 375/341 |
| 2009/0213741 A1 * | 8/2009 | Wang et al. | .................. 370/252 |

(Continued)

FOREIGN PATENT DOCUMENTS

| | | |
|---|---|---|
| EP | 2086151 A2 | 8/2009 |
| WO | 2009157849 A1 | 12/2009 |

OTHER PUBLICATIONS

Cheng, Coding Performance of Hybrid ARQ Schemes, IEEE Trans. On Communications, vol. 54, No. 6, Jun. 2006.

Peng Wu and Nihar Jindal, Performance of hybrid-ARQ in block-fading channels: a fixed outage probability analysis, IEEE Transactions on Communications, vol. 58, No. 4, 2010.

Shen, C. et al., "On the Average Rate Performance of Hybrid-ARQ in Quasi-Static Fading Channels," IEEE Trans. on Communications, vol. 57, No. 11, Nov. 2009.

(Continued)

*Primary Examiner* — Kwang B Yao
*Assistant Examiner* — Nguyen Ngo
(74) *Attorney, Agent, or Firm* — IP Investment Law Group (57) ABSTRACT

A wireless communication system includes: a control module configured to calculate a maximum throughput to represent a spectral efficiency; a storage module, coupled to the control module, configured to store the maximum throughput in a throughput table; and a communication module, coupled to the control module, configured to transmit a channel quality indicator as a feedback, selected from the throughput table, based on a largest value of the maximum throughput.

20 Claims, 5 Drawing Sheets

(56) References Cited

U.S. PATENT DOCUMENTS

| | | | |
|---|---|---|---|
| 2011/0199933 A1* | 8/2011 | Liu et al. | 370/252 |
| 2012/0039207 A1 | 2/2012 | Eriksson et al. | |
| 2012/0099430 A1* | 4/2012 | Vos et al. | 370/235 |
| 2012/0120824 A1* | 5/2012 | Meylan et al. | 370/252 |
| 2012/0230290 A1* | 9/2012 | Seo et al. | 370/329 |
| 2013/0121288 A1 | 5/2013 | Wang et al. | |
| 2013/0279331 A1* | 10/2013 | Pluntke et al. | 370/230 |
| 2013/0343255 A1* | 12/2013 | Han et al. | 370/312 |
| 2014/0355535 A1* | 12/2014 | Cai et al. | 370/329 |

OTHER PUBLICATIONS

Ohlmer, et al. "Rate Adaptation for Time Variant MIMO Channels with Linear Receivers." IEEE Vehicular Technology Conference (VTC Fall), 2011.

Frenger Parkvall and Dahlman, Ericsson Research, Performance Comparison of HARQ with Chase Combining and Incremental Redundancy for HSDPA, IEEE VTS 54th Vehicular Technology Conference, Fall 2001.

* cited by examiner

WIRELESS COMMUNICATION SYSTEM WITH RATE SELECTION MECHANISM AND METHOD OF OPERATION THEREOF

CROSS-REFERENCE TO RELATED APPLICATION(S)

This application claims the benefit of U.S. Provisional Patent Application Ser. No. 61/694,722 filed Aug. 24, 2012, and the subject matter thereof is incorporated herein by reference thereto.

TECHNICAL FIELD

An embodiment of the present invention relates generally to a wireless communication system, and more particularly to a system for optimizing throughput for wireless communication.

BACKGROUND

The next generation cellular mobile system, can support smart phones, laptop computers, tablet computers, and automobile communication systems. Since both pico-cell and femto-cell services were launched, the interference signal from these local cells has also become a major source to degrade the performance for the desired signal. In case of a point-to-point communication where a single transmitter sends a signal to the designated receiver, there is a protocol between a base station (eNodeB) and a user equipment (UE) so that they can share systematic parameters, such as modulation-and-coding scheme (MCS), handshake signals (ACK/NACK), and control information, that is needed for decoding the desired signal.

Wireless communication systems typically employ one or more modulation schemes to communicate voice, data, and control information between the base station and the user equipment. The communication sequences must be decoded from frequency transmissions.

In cellular mobile communications systems like high speed downlink packet access (HSDPA) or long-term evolution (LTE), adaptive modulation and coding (AMC) can be used as a technique for increasing reliability of wireless communication. The wireless communication system may use a channel-quality indicator (CQI) to support the AMC. The CQI is an information exchange regarding a channel condition between the BS and the UE. The BS determines the modulation and coding scheme used in transmission by logging the CQI received from the UE. If the channel condition is determined to be good by the use of the CQI, the BS may increase a data rate by increasing a modulation order or a coding rate. If the channel condition is determined to be poor by the use of the CQI, the BS can adjust the data rate by decreasing the modulation order or the coding rate.

For the periodic transmission, a CQI information amount, a modulation scheme, a channel coding scheme, etc., may be predetermined. The CQI from the UE can be overridden by the BS in order to maintain the planned MCS. Since the wireless communication system is a time variant system, the channel condition changes over time. If a CQI transmission period is significantly long or the BS overrides the CQI from the UE, the BS cannot recognize the changed channel condition. In this case, the BS cannot determine suitable changes to the MCS for the most recent channel condition. This can result in deterioration of reliability of the wireless communication system, and deterioration of overall system performance.

Thus, a need still remains for a wireless communication system with rate selection mechanism to optimize the communication performance while managing the error rate caused by environmental changes in the channel. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a wireless communication system including: a control module configured to calculate a maximum throughput to represent a spectral efficiency; a storage module, coupled to the control module, configured to store the maximum throughput in a throughput table; and a communication module, coupled to the control module, configured to transmit a feedback, selected from the throughput table, based on a largest value of the maximum throughput.

An embodiment of the present invention provides a method of operation of a wireless communication system including: calculating a maximum throughput, representing a spectral efficiency, for each possible entry of a channel quality indicator; storing, in a throughput table, the maximum throughput; and selecting a channel quality indicator for transmitting a feedback, including accessing the throughput table for selecting the feedback having a largest value of the maximum throughput.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The embodiment of the present invention provides a system and method for wireless communication system that employs an adaptive modulation and coding scheme to communicate voice, data, and control information between the base station and a mobile device. A range of modulation can be represented by a feedback, such as a channel-quality indicator, sent from the mobile device to the base station. The mobile device can characterize the response from the base station to the feedback in order to maximize the throughput within a slow adaptive link environment of a fading channel by calculating a hybrid automatic repeat request over correlated fading (HCF) throughput.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof The term "channel-quality indicator" referred to herein are a system of message exchange sequences used to optimize the use of communication bandwidth. The channel-quality indicator can include for example suggested changes to the modulation and coding scheme. The term "ACK" referred to herein is an industry standard term meaning a positive acknowledgement for the receipt of a message. The term "NACK" referred to herein is an industry standard term meaning a negative acknowledgement for the receipt of a message. The term "spectral efficiency" referred to herein is a total data rate of all resources assigned to a channel.

The term "adaptive modulation and coding (AMC)" referred to herein is a process of adjusting the transmission characteristics to adapt to changing conditions of the communication channel. The term "slow link adaptation (SLA)" referred to herein is a technique of AMC which establishes the transmission characteristics based on the average channel statistics. The term "HARQ" referred to herein is an industry standard term meaning "hybrid automatic repeat request" and is a protocol defined in the 3GPP LTE standard.

Figure 1:
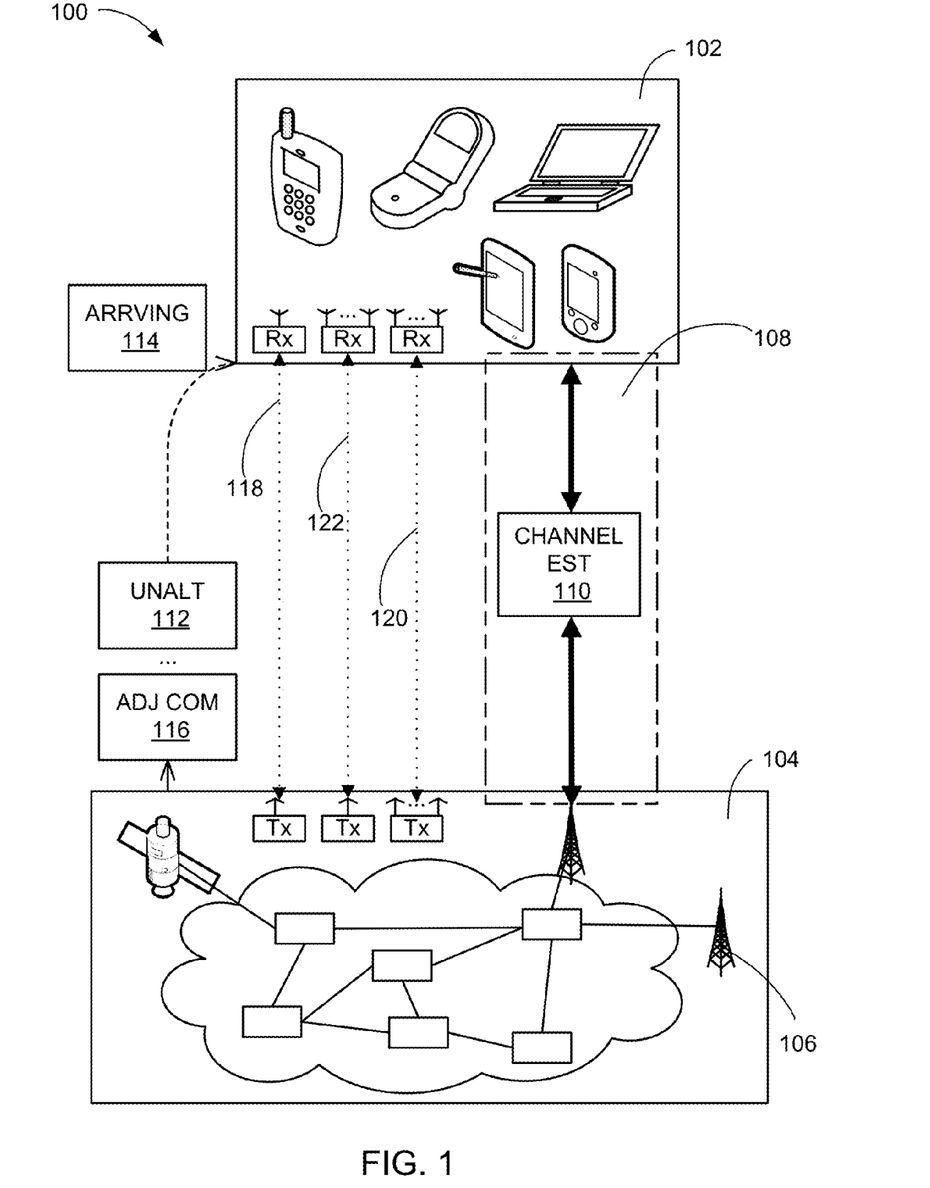
FIG. 1 is a wireless communication system with channel-quality indicator mechanism in an embodiment of the present invention.

Referring now to FIG. 1, therein is shown a wireless communication system 100 with interference cancellation mechanism in an embodiment of the present invention. The wireless communication system 100 includes a mobile device 102, such as the user equipment (UE) in the form of a cellular phone or a notebook computer, connected to a network 104.

The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station (BS) 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof. The base station 106 can include apparatus for encoding and transmitting a wireless communication, while maintaining a maximum error rate for the transfer of information.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer. The mobile device 102 can connect to and communicate with other devices, such as other mobile devices, servers, computers, telephones, or a combination thereof.

The base station 106 can be used to wirelessly exchange signals for communication, including voice signals of a telephone call or data representing a website and interactions therewith. The base station 106 can also transmit reference signals, training signals, error detection signals, error correction signals, header information, transmission format, protocol information, or a combination thereof.

Based on the communication protocol, such as fourth generation (4G) standards, long term evolution (LTE) or high speed packet access (HSPA), the communication signals can include reference portions, header portions, format portions, error correction or detection portion, or a combination thereof imbedded in the communicated information. The reference portions, header portions, format portions, error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The channel 108 and the effects thereof can be represented by a channel estimate 110. The channel estimate 110 is a description of changes to signals caused by the channel 108. The channel estimate 110 can be described to quantize reflection, loss, refraction, obstructions, or a combination thereof that a signal can experience while traversing between the base station 106 and the mobile device 102. The channel estimate 110 can further characterize interference that the mobile device 102 can experience from other transmitters, such as other mobile devices or other base stations, or from the movement of the mobile device 102. The channel estimate 110 can characterize the channel 108 as a fading channel. The fading channel effect can be the result of a multiple paths within the channel 108, each having a different time delay, amplitude, and phase.

For example, the base station 106 can transmit a desired input signal 112, such as the desired input to the mobile device 102. The desired input signal 112 can change while traversing through the channel 108 due to the qualities therein, such as from delayed signal reflections from various buildings, from interferences other nearby transmitting sources, from the Doppler Effect experienced when the mobile device 102 is in transit, or a combination thereof. The mobile device 102 can receive an arriving communication 114, which is the desired input signal 112 that has been changed due to qualities of the channel 108.

The mobile device 102 can determine the channel estimate 110 from the arriving communication 114. For example, the mobile device 102 can compare the information in the reference or training portion to the standardized or intended information in the reference or training portion to determine the channel estimate 110.

The wireless communication system 100 can employ link adaptation strategies for controlling the communication between devices. Link adaptation strategy can have the mobile device 102 feedback and report information associated with the channel 108 to the base station 106. The base station 106 can use the feedback information to adjust various aspects of the communication with the mobile device 102.

The wireless communication system 100 employing link adaptation strategy can inherently have a delay between characterizing the channel 108 based on a communication, feeding information back to the base station 106, and making the adjustment based on the communication. The delay can cause the adjustments to be incorrect due to changes in the channel 108 during the delay. It is specifically difficult for the base station 106 to adjust for the channel 108 being a fading channel.

For example, the mobile device 102 can characterize the channel 108 based on the arriving communication 114 corresponding to the desired input signal 112. The characterization of the channel 108 will represent the channel estimate 110 at the time of receiving the arriving communication 114. The channel 108 can change during the time necessary to determine the channel estimate 110, send feedback information to the base station 106, and have the base station 106 make adjustments accordingly. The adjustments made based on the arriving communication 114 are not always relevant due to changes in the channel 108 at the time of transmitting an adjusted communication 116.

For illustrative purposes, the base station 106 will be described as transmitting signals and the mobile device 102 as receiving and replying to the transmitted signals. However, it is understood that both the mobile device 102 and the base station 106 can each transmit and receive signals.

Also for illustrative purposes, the wireless communication system 100 will be described as employing the channel 108, such as a single-input single-output (SISO) scheme for communicating with one antenna on the transmitter and one antenna on the receiver. However, it is understood that the wireless communication system 100 can employ a multiple-input multiple-output (MIMO) scheme 118 including a single-input multiple-output (SIMO) scheme 120 and a multiple-input single-output (MISO) scheme 122. The multiple-input multiple-output scheme 118 can have one or more antennas on the transmitter end, at the base station 106, communicating with one or more antennas on the receiver end, at the mobile device 102.

The multiple-input multiple-output scheme 118 can include the single-input multiple-output scheme 120 having a single antenna at the base station 106 communicating with multiple antennas on the mobile device 102. The multiple-input multiple-output scheme 118 can further include the multiple-input single-output scheme 122 having multiple antennas at the base station 106 communicating with a single antenna on the mobile device 102.

For further illustrative purposes, the mobile device 102 will be described as directly communicating with the base station 106. However, it is understood that the mobile device 102 can communicate with the base station 106 through other devices, such as a repeater, another mobile device, a router, or a combination thereof. It is also understood that the mobile device 102 can access the network 104 through devices other than the base station 106.

Figure 2:
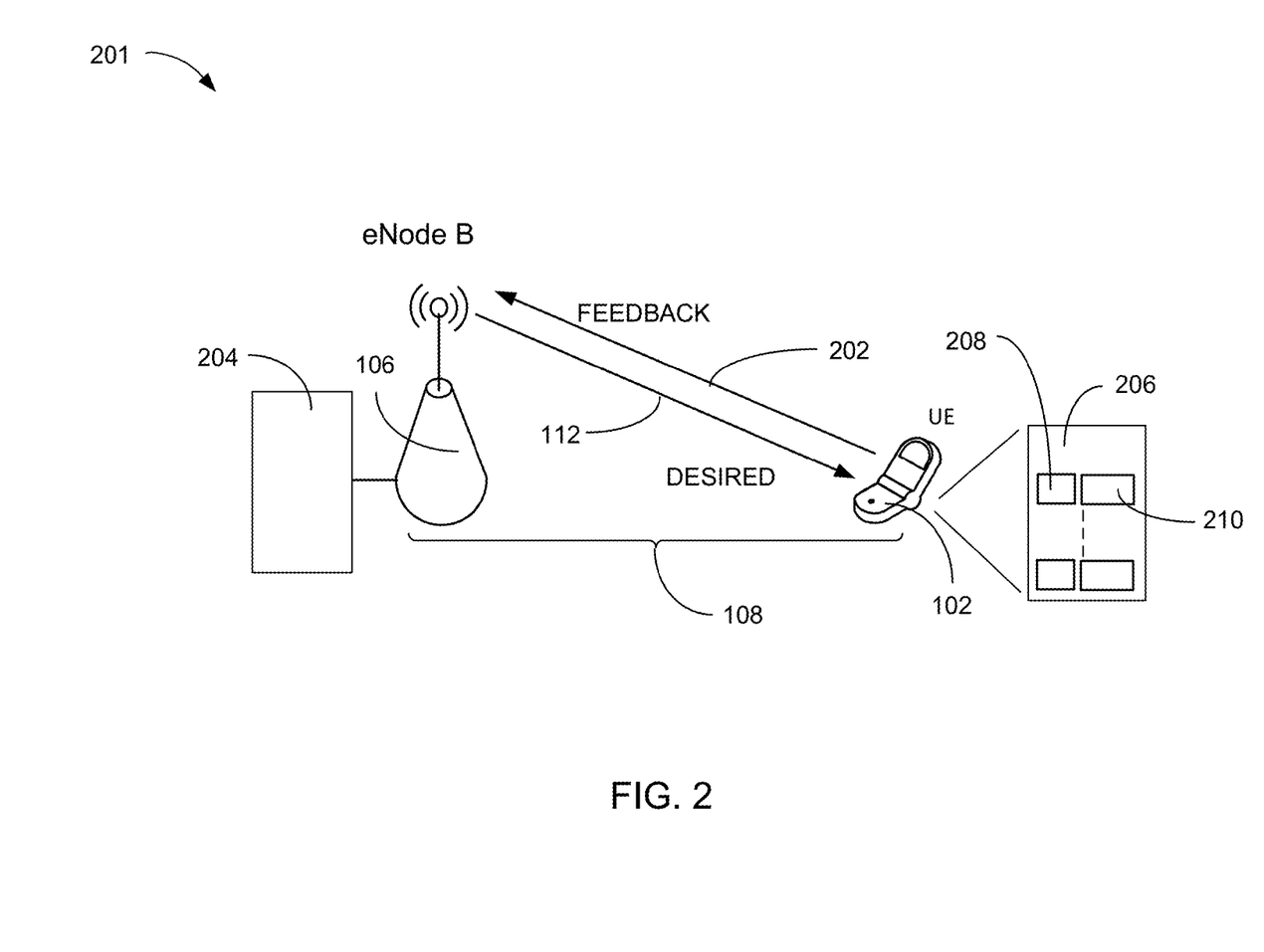
FIG. 2 is a system diagram of an application of the wireless communication system of FIG. 1.

Referring now to FIG. 2, therein is shown a system diagram of an application 201 of the wireless communication system 100 of FIG. 1. The system diagram of the application 201 depicts, as an example, the mobile device 102 receiving the desired input signal 112 from the base station 106, such as an eNode B, a wireless base station, a communication transceiver, or a wireless hot spot. The mobile device 102 is depicted as a cell phone, as an example.

The base station 106 can communicate with the mobile device 102 by adaptive modulation and coding (AMC). The base station 106 can communicate with the mobile device 102 in order to transfer the desired input signal 112 and the mobile device 102 can respond to the base station 106 through a feedback 202, such as a channel-quality indicator (CQI). The feedback 202 can be a message from the mobile device 102 to the base station 106 for the purpose of adjusting the parameters of subsequent transmissions in order to improve the throughput of those transmissions. The exchange of the feedback 202 between the mobile device 102 and the base station 106 can include the carrier level received by the UE, signal strength received, and the bit error rate. The purpose of the feedback 202 is to enable the base station 106 to adjust the modulation, coding, and signal strength of subsequent transmissions.

AMC methods can be classified into two broad categories, such as slow link adaptation (SLA) and fast link adaptation (FLA). SLA refers to a type of AMC where the attempted rate is based on the average channel statistics, whereas FLA tracks the instantaneous variations in the channel. There can be a delay $\tau_{AMC\_delay}$ between the time the feedback 202 is generated and the time this affects the MCS on the downlink. The delay $\tau_{AMC\_delay}$ can be several tens of milliseconds, though the specific value depends on the network. When the delay $\tau_{AMC\_delay}$ is considerable relative to the channel coherence time, such as in high speed mobility, it is difficult to predict the future channel state for CQI generation. In such a scenario, SLA can perform better than fast link adaptation (FLA), where AMC tries to track the instantaneous channel.

The varied responses from the base station 106 can erode the performance of the mobile device 102 in an attempt to minimize the overhead of the base station 106. The base station 106 can maintain a modulation coding scheme (MCS) table 204 in order to tabulate the response to the feedback 202 of the mobile device 102. The channel 108 can be a correlated fading channel in a slow link adaptation (SLA) environment. The correlated fading channel of the channel 108 can be caused by a Doppler effect from movement of the mobile device 102 relative to the base station 106. The fading channel can be correlated because the sample rate of the wireless communication system 100 is fast enough that the velocity of the mobile device 102 appears constant over many samples.

The response by the base station 106 can be in conflict with the performance goals of the mobile device 102. In order to enhance the performance of the wireless communication between the base station 106 and the mobile device 102, it is beneficial for the mobile device 102 to understand the hybrid automatic repeat request (HARQ) of the base station 106 to the feedback 202, which can reflect the contents of the MCS table 204 within the base station 106.

The mobile device 102 can take advantage of HARQ by monitoring the channel 108 and, when the conditions are right, by reporting the feedback 202 transmitted to the base station 106 as a high CQI, whose corresponding entry in the MCS table 204 requires one or more retransmissions for successful decoding, in order to optimize the throughput of the base station 106 in responding to the mobile device 102. The behavior of the base station 106 can be manipulated by the HARQ process of the base station 106 in changing the coding and modulation schemes in response to the feedback 202 from the mobile device 102.

The result of the analysis can be stored in a throughput table 206, such as a HARQ over correlated fading (HCF) table, within the mobile device 102. The content of the throughput table 206, such as a look-up table for determining probability of an outage based on the link quality metric (LQM), of the possible responses by the base station 106 to the feedback 202, can provide the mobile device 102 with a strategy for optimizing the throughput of the wireless communication between the base station 106 and the mobile device 102. The throughput table 206 can contain an array of channel quality indicators 208 each having a calculated value of a maximum throughput 210, such as maximizing the information per unit of time as in bits per second, bits per second per resource block (RB) in the LTE context, and bits per second per high speed downlink packet access (HSDPA) Orthogonal Variable Spreading Factor (OVSF) code in the 3G context. The maximum throughput 210 representing the total data rate or spectral efficiency can be calculated taking HARQ into account.

It has been discovered that the wireless communication system 100 can provide the feedback 202, such as channel-quality indicator (CQI) mechanism, that is knowledgeable of the HARQ capabilities of the MCS table 204 for optimizing the throughput by understanding the probability of a response based on the MCS table 204 within the base station 106. The mobile device 102 can communicate with the base station 106 through the feedback 202 in order to identify the optimum channel-quality indicator to transmit in order to maximize the throughput. The exchange between the desired input signal 112 and the feedback 202 provides the mobile device 102 with detailed information on the MCS table 204 required to solicit the highest bandwidth response for the base station 106. The mobile device 102 can maintain the throughput table 206 in order to maintain the maximum throughput 210, such as maximizing the information per unit of time as in bits per second, bits per second per resource block (RB) in the LTE context, and bits per second per the high speed downlink packet access (HSDPA) Orthogonal Variable Spreading Factor (OVSF) code in the 3G context, based on the probability of soliciting a predictable response from the MCS table 204.

Figure 3:
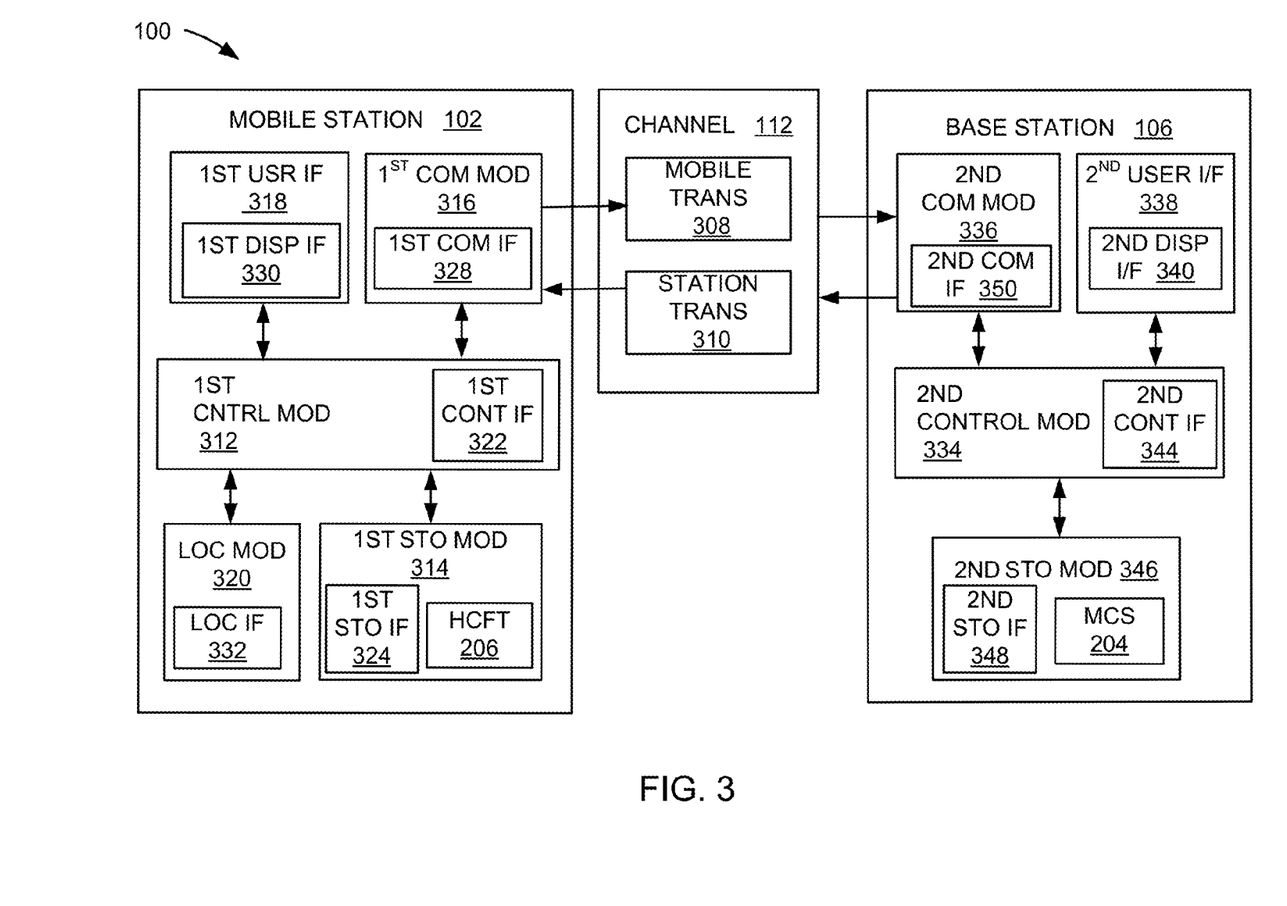
FIG. 3 is an exemplary block diagram of the wireless communication system.

Referring now to FIG. 3, therein is shown an exemplary block diagram of the communication system 100. The communication system 100 can include the mobile device 102, the network 104, and the base station 106. The mobile device 102 can send information in a mobile transmission 308 over the network 104 to the base station 106. The base station 106 can send information in a base transmission 310 over the network 104 to the mobile device 102.

For illustrative purposes, the communication system 100 is shown with the mobile device 102 as a client device, although it is understood that the communication system 100 can have the mobile device 102 as a different type of device. For example, the mobile device 102 can be a server.

Also for illustrative purposes, the communication system 100 is shown with the base station 106 as a server, although it is understood that the communication system 100 can have the base station 106 as a different type of device. For example, the base station 106 can be a client device.

For brevity of description in this embodiment of the present invention, the mobile device 102 will be described as a client device and the base station 106 will be described as a server device. The embodiment of the present invention is not limited to this selection for the type of devices. The selection is an example of the embodiment of the present invention.

The mobile device 102 can include a first control module 312, a first storage module 314, a first communication module 316, and a first user interface 318. The first control module 312 can include a first control interface 322. The first control module 312 can be configured to calculate a channel estimate 110 from the arriving communication 114. The first control module 312 can interrogate the throughput table 206 to provide a maximum throughput to the communication system 100.

The first control module 312 can be implemented in a number of different manners. For example, the first control module 312 can be a processor, an application specific integrated circuit (ASIC) an embedded processor, a microprocessor, a hardware control logic, a hardware finite state machine (FSM), a digital signal processor (DSP), or a combination thereof. The first control module 312 manipulates the throughput table 206 based on statistics of the link quality metrics. The first control interface 322 can be used for communication between the first control module 312 and other functional modules in the mobile device 102. The first control interface 322 can also be used for communication that is external to the mobile device 102.

The first control interface 322 can receive information from the other functional modules or from external sources, or can transmit information to the other functional modules or to external destinations. The external sources and the external destinations refer to sources and destinations external to the mobile device 102.

The first control interface 322 can be implemented in different ways and can include different implementations depending on which functional modules or external modules are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage module 314 can store the base station behavior matrix (BBM) 206. The first storage module 314 can also store the relevant information, such as data representing incoming messages, data representing the block error rate, message statistics, the feedback 202 of FIG. 2, sound files, or a combination thereof.

The first storage module 314 can be a volatile memory, a nonvolatile memory, an internal memory, an external memory, or a combination thereof. For example, the first storage module 314 can be a nonvolatile storage such as non-volatile random access memory (NVRAM), Flash memory, disk storage, or a volatile storage such as static random access memory (SRAM).

The first storage module 314 can include a first storage interface 324. The first storage interface 324 can be used for communication between and other functional modules in the mobile device 102. The first storage interface 324 can also be used for communication that is external to the mobile device 102.

The first storage interface 324 can receive information from the other functional modules or from external sources, or can transmit information to the other functional modules or to external destinations. The external sources and the external destinations refer to sources and destinations external to the mobile device 102.

The first storage interface 324 can include different implementations depending on which functional modules or external modules are being interfaced with the first storage module 314. The first storage interface 324 can be implemented with technologies and techniques similar to the implementation of the first control interface 322.

The first communication module 316 can enable external communication to and from the mobile device 102. For example, the first communication module 316 can permit the mobile device 102 to communicate with the base station 106 of FIG. 1, an attachment, such as a peripheral device or a computer desktop, and the network 104.

The first communication module 316 can also function as a communication hub allowing the mobile device 102 to function as part of the network 104 and not limited to be an end point or terminal module to the network 104. The first communication module 316 can include active and passive components, such as microelectronics or an antenna, for interaction with the network 104.

The first communication module 316 can include a first communication interface 328. The first communication interface 328 can be used for communication between the first communication module 316 and other functional modules in the mobile device 102. The first communication interface 328 can receive information from the other functional modules or can transmit information to the other functional modules.

The first communication interface 328 can include different implementations depending on which functional modules are being interfaced with the first communication module 316. The first communication interface 328 can be implemented with technologies and techniques similar to the implementation of the first control interface 322.

The first user interface 318 allows a user (not shown) to interface and interact with the mobile device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control module 312 can operate the first user interface 318 to display information generated by the wireless communication system 100. The first control module 312 can also manipulate the throughput table 206 for the other functions of the wireless communication system 100. The first control module 312 can further analyze the throughput table 206 in order to optimize the throughput from the network 104 via the first communication module 316.

The base station 106 can be optimized for implementing the embodiment of the present invention in a multiple device embodiment with the mobile device 102. The base station 106 can provide the additional or higher performance processing power compared to the mobile device 102. The base station 106 can include a second control module 334, a second communication module 336, and a second user interface 338.

The second user interface 338 allows a user (not shown) to interface and interact with the base station 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof The second control module 334 can execute a second software 342 to provide the intelligence of the base station 106 of the communication system 100. The second software 342 can operate in conjunction with the first software 326. The second control module 334 can provide additional performance compared to the first control module 312.

The second control module 334 can operate the second user interface 338 to display information. The second control module 334 can also maintain the modulation and coding scheme table (MCS) 204 for the other functions of the wireless communication system 100, including operating the second communication module 336 to communicate with the mobile device 102 over the network 104.

The second control module 334 can be implemented in a number of different manners. For example, the second control module 334 can be a processor, an embedded processor, a microprocessor, hardware control logic, a hardware finite state machine (FSM), a digital signal processor (DSP), or a combination thereof.

The second control module 334 can include a second controller interface 344. The second controller interface 344 can be used for communication between the second control module 334 and other functional modules in the base station 106. The second controller interface 344 can also be used for communication that is external to the base station 106.

The second controller interface 344 can receive information from the other functional modules or from external sources, or can transmit information to the other functional modules or to external destinations. The external sources and the external destinations refer to sources and destinations external to the base station 106.

The second controller interface 344 can be implemented in different ways and can include different implementations depending on which functional modules or external modules are being interfaced with the second controller interface 344. For example, the second controller interface 344 can be implemented to include a pressure sensor, an inertial sensor, a microelectromechanical system (MEMS), optical circuitry, waveguides, wireless circuitry, wireline circuitry, or a combination thereof.

A second storage module 346 can store the second software 342. The second storage module 346 can also store the data representing incoming messages, data representing block error rate targets, sound files, or a combination thereof. The second storage module 346 can be sized to provide the additional storage capacity to supplement the first storage module 314.

For illustrative purposes, the second storage module 346 is shown as a single element, although it is understood that the second storage module 346 can be a distribution of storage elements. Also for illustrative purposes, the communication system 100 is shown with the second storage module 346 as a single hierarchy storage system, although it is understood that the communication system 100 can have the second storage module 346 in a different configuration. For example, the second storage module 346 can be formed with different storage technologies forming a memory hierarchal system including different levels of caching, main memory, rotating media, or off-line storage.

The second storage module 346 can be a volatile memory, a nonvolatile memory, an internal memory, an external memory, or a combination thereof. For example, the second storage module 346 can be a nonvolatile storage such as non-volatile random access memory (NVRAM), Flash memory, disk storage, or a volatile storage such as static random access memory (SRAM).

The second storage module 346 can include a second storage interface 348. The second storage interface 348 can be used for communication between other functional modules in the base station 106. The second storage interface 348 can also be used for communication that is external to the base station 106.

The second storage interface 348 can receive information from the other functional modules or from external sources, or can transmit information to the other functional modules or to external destinations. The external sources and the external destinations refer to sources and destinations external to the base station 106.

The second storage interface 348 can include different implementations depending on which functional modules or external modules are being interfaced with the second storage module 346. The second storage interface 348 can be implemented with technologies and techniques similar to the implementation of the second controller interface 344.

The second communication module 336 can enable external communication to and from the base station 106. For example, the second communication module 336 can permit the base station 106 to communicate with the mobile device 102 over the network 104.

The second communication module 336 can also function as a communication hub allowing the base station 106 to function as part of the network 104 and not limited to be an end point or terminal module to the network 104. The second communication module 336 can include active and passive components, such as microelectronics or an antenna, for interaction with the network 104.

The second communication module 336 can include a second communication interface 350. The second communication interface 350 can be used for communication between the second communication module 336 and other functional modules in the base station 106. The second communication interface 350 can receive information from the other functional modules or can transmit information to the other functional modules.

The second communication interface 350 can include different implementations depending on which functional modules are being interfaced with the second communication module 336. The second communication interface 350 can be implemented with technologies and techniques similar to the implementation of the second controller interface 344.

The first communication module 316 can couple with the network 104 to send information to the base station 106 in the mobile transmission 308. The base station 106 can receive information in the second communication module 336 from the mobile transmission 308 of the network 104.

The second communication module 336 can couple with the network 104 to send information to the mobile device 102 in the base transmission 310. The mobile device 102 can receive information in the first communication module 316 from the base transmission 310 of the network 104. The wireless communication system 100 can be executed by the first control module 312, the second control module 334, or a combination thereof. For illustrative purposes, the base station 106 is shown with the partition having the second user interface 338, the second storage module 346, the second control module 334, and the second communication module 336, although it is understood that the base station 106 can have a different partition. For example, the second software 342 can be partitioned differently such that some or all of its function can be in the second control module 334 and the second communication module 336. Also, the base station 106 can include other functional modules not shown in FIG. 3 for clarity.

The functional modules in the mobile device 102 can work individually and independently of the other functional modules. The mobile device 102 can work individually and independently from the base station 106 and the network 104.

The functional modules in the base station 106 can work individually and independently of the other functional modules. The base station 106 can work individually and independently from the mobile device 102 and the network 104.

For illustrative purposes, the communication system 100 is described by operation of the mobile device 102 and the base station 106. It is understood that the mobile device 102 and the base station 106 can operate any of the modules and functions of the communication system 100.

The modules described in this application can be hardware implementation or hardware accelerators in the first control module 312 or in the second control module 334. The modules can also be hardware implementation or hardware accelerators within the first device 102 or the second device 106 but outside of the first control module 312 or the second control module 334, respectively.

Figure 4:
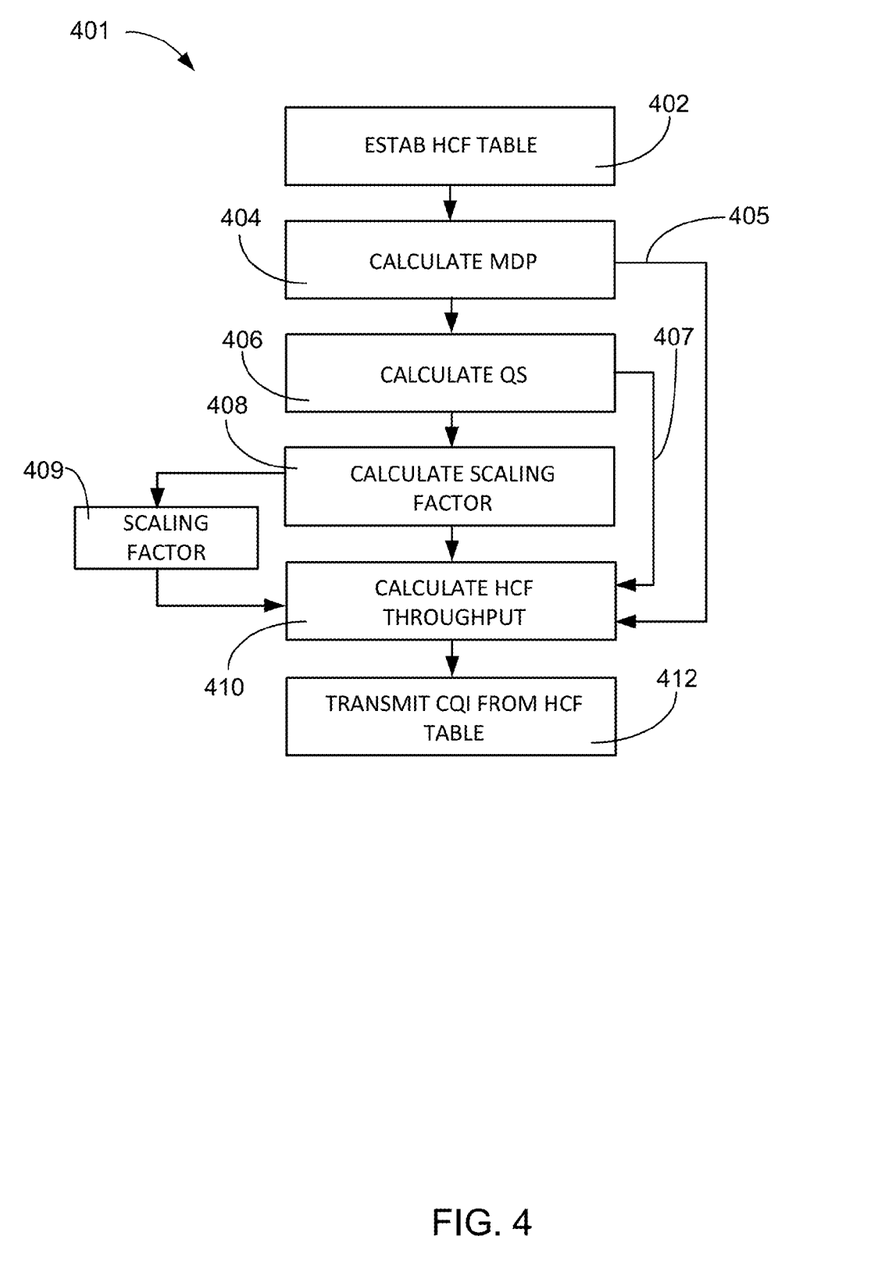
FIG. 4 is a flow chart of a channel-quality indicator selection process for the throughput table.

Referring now to FIG. 4, therein is shown a flow chart of a channel-quality indicator selection process 401 for the throughput table 206 of FIG. 2. The flow chart of the channel-quality indicator selection process 401 depicts a method of calculating the link throughput in the presence of HARQ as a function of the attempted rate. This calculation takes the correlation of the fading channel into account. This is in a slow link adaptation (SLA) setting and finds the throughput optimal attempted rate, given the channel correlation statistics and HARQ settings.

The first control module 312 of FIG. 3 can calculate the throughput, in the presence of HARQ, by considering two extreme levels of correlation. In a first case, the correlation of the channel in successive transmissions can be ignored and the throughput can be calculated by modeling the HARQ process as a Markov decision process (MDP).

In another case, the first control module 312 can calculate the throughput by modeling the channel across transmissions as a quasi-static process (QS). The first control module 312 can calculate the weighted average of the MDP throughput and the QS throughput. The first control module 312 can base the weighting on the correlation statistics of the channel 108 of FIG. 1. The weighting factor is related to the entropy rate of the channel 108. The weighted average throughput can be referred to as a HCF throughput.

The channel-quality indicator selection process 401 in the mobile device 102 of FIG. 1 can exploit HARQ. An establish throughput table module 402 can establish the size of the throughput table 206 for supporting 3GPP LTE downlink represented by the channel 108. The support of 3GPP LTE requires 15 different CQI values. The establish throughput table module 402 can allocate an array of storage for each of the CQI values in order to calculate the HCF throughput. The establish throughput table module 402 can transfer control to a calculate Markov decision process (MDP) module 404.

In the calculate MDP module 404, the first control module 312 can calculate a Markov decision process (MDP) throughput 405, such as an average throughput after N transmissions including the 1$^{st}$ transmission, as follows:

$$T_N^{MDP}(r) = r \frac{1 - p^{(N)}}{1 + \sum_{n=1}^{N-1} p^{(n)}} \qquad \text{Equation 1}$$

Where n is the number of transmissions of a given block including the first transmission, N is the total number of transmissions allowed by HARQ, r is the attempted rate from the MCS table 204, and $p^{(n)}$ is the outage probability of a failed transmission after n transmissions. By way of an example, if the 1st transmission—n=1, probability of outage is p(1). For notational convenience, we can define p(0)=1

The calculate MDP module 404 can pass control to a calculate quasi-static (QS) module 406, where the first control module 312 can calculate a quasi-static (QS) throughput 407 a quasi-static fading channel for the channel 108. In this calculation there is only a single fading state h for all transmissions. The average link throughput for the channel 108 can be calculated by:

$$T_N^{QS}(r) = \sum_{n=1}^{N} \frac{r}{n} (p^{(n-1)} - p^{(n)}) \qquad \text{Equation 2}$$

Where r is the attempted rate of transmission, n is the number of retransmissions after an initial NACK, N is the total number of transmissions allowed by HARQ.

The first control module 312 can calculate the probability of failure after n transmissions, where n≥1 by:

$$p_{out,n} = P[I(X_0^{n-1}; Y_0^{n-1}|H_0^{n-1}) < r] \qquad \text{Equation 3}$$

Where $I(X_0^m; Y_0^m|H_0^m) < r$ represents a declared outage because the mutual information is less than the attempted rate.

In order to combine the throughput results from the calculate MDP module 404 and the calculate QS module 406, a calculate scaling factor module 408 can determine that a scaling factor ζ 409, which denotes the ratio of the one-step prediction error to the variance and when the channel has a spectral density function S(ω), can be calculated by:

$$\zeta = \frac{e^{\int_{-\pi}^{\pi} \log S(\omega) \frac{d\omega}{2\pi}}}{\int_{-\pi}^{\pi} S(\omega) \frac{d\omega}{2\pi}} \qquad \text{Equation 4}$$

Where the numerator $$e^{\int_{-\pi}^{\pi} \log S(\omega) \frac{d\omega}{2\pi}}$$

is the mean square error in predicting the current state H$_1$ based on the infinite past H$_{-\infty}^0$, also known as the one-step prediction error. The denominator is simply the variance of H, assuming the fading process has zero mean.

The calculate scaling factor module 408 can pass the scaling factor ζ 409 to a calculate HCF throughput module 410 in order to calculate the maximum throughput (T$_N^{HCF}$) 210 corresponding to each entry in the MCS table 204 by applying the scaling factor 409 to the Markov decision process (MDP) throughput 405 and a quasi-static (QS) throughput 407 for each of the possible entry of the throughput table 206. This calculation can be performed by the first control module 312 as:

$$T_N^{HCF}(r) = \zeta T_N^{MDP}(r) + (1-\zeta) T_N^{QS}(r) \qquad \text{Equation 5}$$

Where r is the attempted rate from the MCS table 204. The scaling factor ζ 409 can be shown to relate to the entropy of the fading channel process. The scaling factor ζ 409 can be approximated by:

$$\zeta = e^{-I(H_{-\infty}^0; H_1)} \qquad \text{Equation 6}$$

If it can be shown that the correlation in the fading channel is well modeled by an autoregressive correlation, then the autocorrelation R$_H$(n) of the fading channel can be calculated by:

$$R_H(n) = \gamma^{|n|} \qquad \text{Equation 7}$$

Where, the correlation coefficient y can be a complex value. The scaling factor ζ 409 can be calculated by:

$$\zeta = \frac{e^{\log 1 - |\gamma|^2}}{1} = 1 - |\gamma|^2 \qquad \text{Equation 8}$$

Once the calculate HCF throughput module 410 has calculated the maximum throughput 210 that can be achieved in the current fading channel process, a corresponding CQI entry can be read from the throughput table 206. The calculate HCF throughput module 410 can then pass control to a transmit CQI module 412. The throughput table 206 can represent 15 levels of the CQI. Each of the entries of the CQI represents a different request for an attempted rate and coding scheme. Since the throughput table 206 has been populated with the calculations of the maximum throughput T$_N^{HCF}$(r) 210, the transmit CQI module 412 would select an ACK CQI value that represents largest value of the maximum throughput 210 by:

$$CQI_{HCF}(n) = \arg\max_{k=1 \ldots MaxCQI} T_N^{HCF}(r_{MCS(k)}) \qquad \text{Equation 9}$$

The transmit CQI module 412 can access the throughput table 206 in order to pass the feedback 202 of FIG. 2, such as an ACK CQI value, to the first communication module 316 of FIG. 3 for transmission to the base station 106.

It has been discovered that by using the Markov decision process (MDP) to model the HARQ process is not always accurate in estimating the throughput gains from HARQ. The MDP model is accurate only when the channel correlation is weak. The quasi-static (QS) model is more accurate than the MDP model when there is sufficient correlation in the link. By applying the scaling factor ζ 409 to the output of the calculate MDP module 404 and the output of the calculate QS module 406 and combining them, the maximum throughput 210 of FIG. 2 can be accurately calculated. A maximum value of the maximum throughput 210 can be maintained between the base station 106 and the mobile device 102 by selecting the largest value of the maximum throughput 210 from the throughput table 206.

It has been discovered that the embodiment of the wireless communication system 100 of FIG. 1 can provide an increase in throughput of data exchanged between the mobile device 102 and the base station 106. The maintenance of the throughput table 206 can allow the mobile device 102 to actively track and adjust to the changing conditions of the channel 108 coupling the base station 106. The use of the first control module 312, to track and adjust the scaling factor $\zeta$ 409 for updating the maximum throughput 210 in the throughput table 206, can provide significant performance gains for the fading channel condition of the channel 108, in a slow adaptive link environment, caused by the Doppler effect due to relative motion between the base station 106 and the mobile device 102.

It is understood that the throughput table 206 can be implemented as a memory device supported by the first control module 312, such as a processor or combinational logic. The first control module 312 can be implemented by digital logic, analog circuitry, or a combination thereof.

Figure 5:
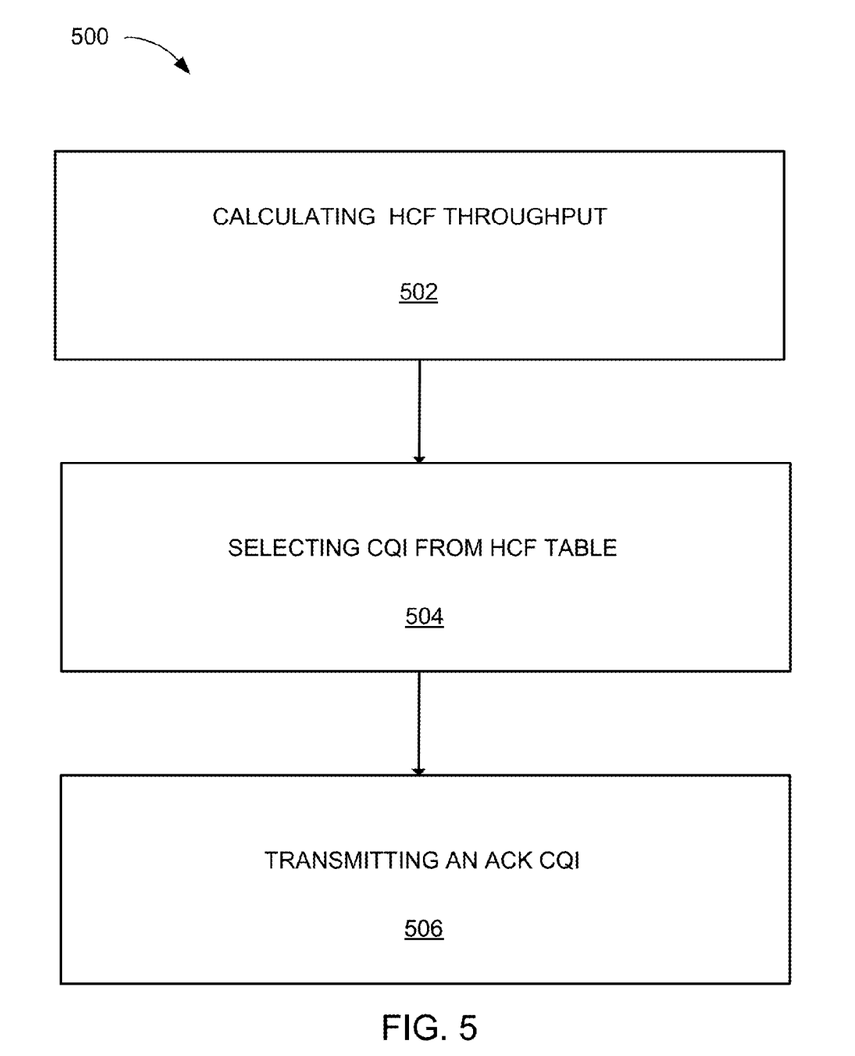
FIG. 5 is a flow chart of a method of operation of a wireless communication system in an embodiment of the present invention.

Referring now to FIG. 5, therein is shown a flow chart of a method 500 of operation of a wireless communication system 100 in an embodiment of the present invention. The method 500 includes: calculating a maximum throughput, representing a spectral efficiency, for each possible entry of a channel quality indicator in a block 502; storing, in a throughput table, the maximum throughput in a block 504; and selecting a channel quality indicator for transmitting a feedback, including accessing the throughput table for selecting the feedback having a largest value of the maximum throughput in a block 506.

The embodiment of the present invention provides that the wireless communication system 100 can optimize the throughput of the transfers between the mobile device 102 and the base station 106 by monitoring fading channel characteristic of the channel 108 by way of the throughput table 206. The wireless communication system 100 can provide an increase in throughput of data exchanged between the mobile device 102 and the base station 106. It has been discovered that the embodiment of the wireless communication system 100 of FIG. 1 can provide an increase in throughput of data exchanged between the mobile device 102 and the base station 106. The maintenance of the throughput table 206 can allow the mobile device to actively track and adjust to the fading conditions of the channel 108 coupling the base station 106. The use of the first control module 312 to track and adjust the throughput table 206 can provide significant performance gains for the fading channel, in a slow adaptive link environment, caused by the Doppler effect due to relative motion between the base station 106 and the mobile device 102.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A wireless communication system comprising:
a control module configured to:
calculate a first throughput level based on modeling a communication process using automatic repeat request based on ignoring a channel in successive transmissions corresponding to the automatic repeat request;
calculate a second throughput level based on modeling the channel across transmissions corresponding to the automatic repeat request;
calculate a maximum throughput based on the first throughput level and the second throughput level to represent a spectral efficiency;
a storage module, coupled to the control module, configured to store the maximum throughput in a throughput table; and
a communication module, coupled to the control module, configured to transmit a channel quality indicator as a feedback, selected from the throughput table, based on a largest value of the maximum throughput.

2. The system as claimed in claim 1 wherein the control module is configured to calculate the maximum throughput based on applying a scaling factor.

3. The system as claimed in claim 1 wherein the storage module includes a storage interface configured to transfer the feedback to a communication interface.

4. The system as claimed in claim 1 wherein the control module is configured to calculate the first throughput level corresponding to a Markov decision process (MDP) throughput and the second throughput level corresponding to a quasi-static (QS) throughput for each possible entry of the throughput table.

5. The system as claimed in claim 1 wherein the communication module includes a communication interface coupled to the control module, the communication interface configured to select a largest value of the maximum throughput transferred to the communication interface.

6. The system as claimed in claim 1 wherein:
the communication module includes a communication interface configured to receive an arriving communication; and
the control module is configured to calculate a channel estimate from the arriving communication.

7. The system as claimed in claim 1 wherein the control module is configured to apply a scaling factor to the first throughput level corresponding to a Markov decision process (MDP) throughput and to the second throughput level corresponding to a quasi-static (QS) throughput.

8. The system as claimed in claim 1 wherein the storage module includes a storage interface configured to transfer the feedback to a communication interface by a controller interface.

9. The system as claimed in claim 1 wherein:
the communication module includes a communication interface configured to receive an arriving signal; and
the storage module includes a storage interface configured to access the throughput table.

10. The system as claimed in claim 1 wherein the control module is configured to apply a scaling factor for each entry in the throughput table.

11. A method of operation of a wireless communication system comprising:
- calculating a first throughput level based on modeling a communication process using automatic repeat request based on ignoring a channel in successive transmissions corresponding to the automatic repeat request;
- calculating a second throughput level based on a different process for modeling the communication process using the automatic repeat request;
- calculating a maximum throughput, representing a spectral efficiency, based on the first throughput level and the second throughput level, the maximum throughput level for each possible entry of a channel quality indicator;
- storing, in a throughput table, the maximum throughput; and
- selecting a channel quality indicator for transmitting a feedback, including accessing the throughput table for selecting the feedback having a largest value of the maximum throughput.

12. The method as claimed in claim 11 wherein calculating the maximum throughput based on applying a scaling factor.

13. The method as claimed in claim 11 wherein selecting the channel quality indicator includes copying the feedback to a communication interface.

14. The method as claimed in claim 11 wherein:
- calculating the first throughput level includes calculating the first throughput level corresponding to a Markov decision process (MDP) throughput for each of the possible entry of the throughput table; and
- calculating the second throughput level includes calculating the second throughput level corresponding to a quasi-static (QS) throughput for each of the possible entry of the throughput table.

15. The method as claimed in claim 11 wherein selecting the channel quality indicator includes transferring a selected value of the channel quality indicator to a communication interface.

16. The method as claimed in claim 11 further comprising:
- configuring a communication interface for receiving an arriving communication; and
- calculating a channel estimate from the arriving communication.

17. The method as claimed in claim 11 wherein calculating the maximum throughput includes applying a scaling factor to the first throughput level corresponding to a Markov decision process (MDP) throughput and to the second throughput level corresponding to a quasi-static (QS) throughput.

18. The method as claimed in claim 11 wherein selecting the channel quality indicator includes copying the feedback to a communication interface by a controller interface.

19. The method as claimed in claim 11 further comprising:
- receiving an arriving signal for calculating a scaling factor; and wherein:
- accessing the throughput table includes configuring a storage interface to access the throughput table.

20. The method as claimed in claim 11 wherein calculating the maximum throughput includes applying a scaling factor for each entry in the throughput table.

* * * * *